United States Patent

Lee et al.

[15] 3,699,392
[45] Oct. 17, 1972

[54] GROUND FAULT DETECTION SYSTEM WITH SEQUENTIAL LINE TESTING

[72] Inventors: Joo C. Lee, 2311 Spring Hill Lane, Lindenhurst, Ill. 60046; Charles S. Tak, 9128 Kennedy Drive, Des Plaines, Ill. 60016

[22] Filed: Nov. 22, 1971
[21] Appl. No.: 200,708

[52] U.S. Cl. .................317/18 R, 317/27 R, 324/51, 340/255
[51] Int. Cl. ................................................H02h 3/28
[58] Field of Search ...317/27 R, 18 R, 18 D; 324/51; 340/255, 253 H, 253 N

[56] References Cited

UNITED STATES PATENTS 3,344,313  9/1967  Kraus.......................317/18 R
3,586,911  6/1971  Kraus.......................317/18 R

*Primary Examiner*—James D. Trammell
*Attorney*—James J. Jennings, Jr.

[57] ABSTRACT

An a-c line, isolated from ground by a transformer, is continuously tested for ground faults through a switching network which sequentially completes a circuit between the a-c conductors, an apparent active power source, and a ground fault detection network. A fault condition detection network is coupled through a bridge circuit to the a-c lines, to provide an indication of a simple fault on either line, or a substantially unbalanced fault on both lines. An oscillator and ring counter arrangement continuously drives a switching network to test for individual line grounds, and balanced and unbalanced double line faults. A self-contained power supply arrangement is provided.

15 Claims, 3 Drawing Figures

3,699,392

GROUND FAULT DETECTION SYSTEM WITH SEQUENTIAL LINE TESTING

BACKGROUND OF THE INVENTION

There are many environments in which electrical equipment must be energized for vital functions, such as patient monitoring and surgical equipment in a hospital operating room, intensive care area, delivery room, and so forth. In such an area a-c energy is generally supplied over a power isolation transformer, to minimize injury to the patient if an undesired ground fault occurs on one or both of the power lines. The equipment normally found in an operating room may have leakage currents of significant amplitudes. A surgical light may have a leakage current of 350 microamperes; an EKG machine may have a leakage of 50 microamperes or more; the electrical wiring leakage current frequently exceeds 100 microamperes; and the ground detector itself may have a leakage current of 500 microamperes. Even without any ground fault, these undesired leakage currents can exceed one milliampere and sound an alarm in those systems where the threshold level of the detector circuit is set in the 1 milliampere range. It is preferable to have a ground detector system which does not burden the critical environment with a large leakage current, while maintaining a very small detector leakage current of the order of 10 microamperes or less.

It is therefore a primary consideration of this invention to provide such a detection system which does not impose a significant leakage current, provides an accurate alarm signal when there is a fault on one of the a-c lines, a fault on the other a-c line, or a simultaneous fault — whether balanced or unbalanced — on both lines.

SUMMARY OF THE INVENTION

The system of this invention is particularly useful for detecting the presence of a ground fault on one or both of a pair of lines which are connected to transfer passive a-c energy between a power isolation transformer and an electrical load. The system includes means, which may be a multiple winding transformer coupled to the lines, for simulating an active power source. This apparent source provides active a-c energy which is either in phase with, or is phase-shifted by 180° relative to, the passive a-c energy being passed over the lines directly to the load. A fault detection network is provided with a detector circuit which is connected to provide an alarm signal when the detector circuit current flow exceeds a preset level. A switching network is coupled both to the pair of lines which transfer the passive energy and to the apparent source of active a-c energy. This switching network is operable in different states to sequentially test the condition of the lines, and to complete a path for passing a current signal exceeding the preset level to the detector circuit when a fault condition occurs. Means, such as an oscillator and ring counter arrangement, is provided for sequentially driving the switching network through its different states to continually test for a ground fault. Means is also provided for energizing the system. In a preferred embodiment a self-contained power supply arrangement is provided, but of course leads or terminals can be provided in lieu of such a power supply, for connection to any source of energy external to the inventive system and independent of the a-c lines.

In accordance with an important aspect of the invention, a fault condition detection network is provided and coupled, through a resistive bridge circuit, to the pair of a-c lines. Responsive to the presence of a ground fault — balanced or unbalanced — on both lines at the same time, the fault condition detection network determines the presence of a balanced fault or a single fault condition, and transmits a command signal to the switching network.

THE DRAWINGS

In the several figures of the drawings like reference numerals identify like components, and in those drawings:

FIG. 1 is a block diagram depicting major components in a preferred embodiment of the inventive system; and FIGS. 2 and 3 are schematic diagrams which, taken together, provide the circuit details of the components shown more generally in FIG. 1.

GENERAL SYSTEM DESCRIPTION

FIG. 1 depicts in block arrangement a system for operating in accordance with this invention to detect a ground fault on line 1, a ground fault on line 2, a simultaneous fault on both lines which is substantially unbalanced, and a balanced ground fault on both lines. As shown in FIG. 1, conventional alternating energy such as 120 volts, 60 hertz a-c is passed over lines 20, 21, and power isolation transformer 22, to lines 1 and 2, referenced 23 and 24. Line 21 of the input power main is grounded, but transformer 22 isolates lines 1 and 2 from ground. Normally the passive energy passed over lines 23, 24 is supplied to a load referenced 25, which can be life support, instrumentation, or other electrical equipment.

Energy from the secondary winding of transformer 22 is passed over lines 26, 27 to a multiple winding transformer 28. Of course this unit can also be a plurality of individual transformers, but is depicted as a single transformer for ease of explanation. This transformer appears as an active power source, looking into the secondary windings. A portion of this active a-c energy is passed over line 30, power factor correction network 31, and line 32 to one input connection of a switching network 33. This switching network also receives passive a-c energy from lines 23, 24 over conductors 34, 35. As will be explained in more detail hereinafter, an important aspect of the present invention is the determination of the fault conditions by comparing the level of the passive a-c energy present on lines 1 and 2 (applied to the switching network over conductors 34, 35) with the level of the active energy (phase-modulated over transformer 28 and power factor correction network 31) passed over line 32 to the switching network 33. The active energy passed over line 32 is "phase-modulated" in the sense that operation of components in switching network 33 in effect reverses the polarity of the active energy. Thus the active energy is always either exactly in phase with, or is phase-shifted by 180° with respect to, the passive a-c energy present on lines 23, 24 which is not passed over transformer 28. Whether exactly in phase or 180° out of phase, it is important that the phase displacement between these two a-c energies be maintained, and this will be definitively set out in connection with the explanation of the circuit shown in FIG. 2.

A ground fault on one or other of lines 23, 24 is sensed in a ground fault detection network 36, which is coupled over line 37 to the switching network 33. The switching network is in turn governed by an oscillator 38 which applies a series of timing pulses to a conventional ring counter 40, which in turn regulates the switching within network 33 between four different states or operating conditions to test for (1) ground on line 1, (2) ground on line 2, (3) a balanced ground on both lines, or (4) a nonbalanced fault condition on both lines.

Energy from transformer 28 is passed over line 41 to a first power supply 42, which as shown energizes the oscillator, ring counter, switching network and the ground fault detection network. Upon the detection of a fault condition on line 1 or 2, network 36 passes a signal over line 43 to an audible and visible alarm system 44. Of course those skilled in the art will appreciate that instead of, or in addition to, the alarm arrangement 44, a system can be regulated by a signal over line 43 to open relay contacts and interrupt the transfer of power over lines 1 and 2 to the load 25. A test unit 45, which may include a simple push button switch, is coupled between detection network 36 and ground to provide an arrangement for testing the system to be certain that it is in operating condition, without contributing any ground current to line 1 or line 2.

A fault condition detection network 46 is coupled over lines 48, 50 to a resistive bridge arrangement 47. Network 46 transmits a command signal over line 51 to switching network 33 whenever a balanced or unbalanced double fault condition occurs. Another power supply unit 52 receives energy over line 53 from transformer 28 and in turn energizes the second fault detection network 46. A third power supply 56 receives energy over line 55 and passes d-c energy to alarm unit 44. With this general perspective of system arrangement, a more definitive explanation will now be set out.

Detailed Description of the Invention

Figure 1:
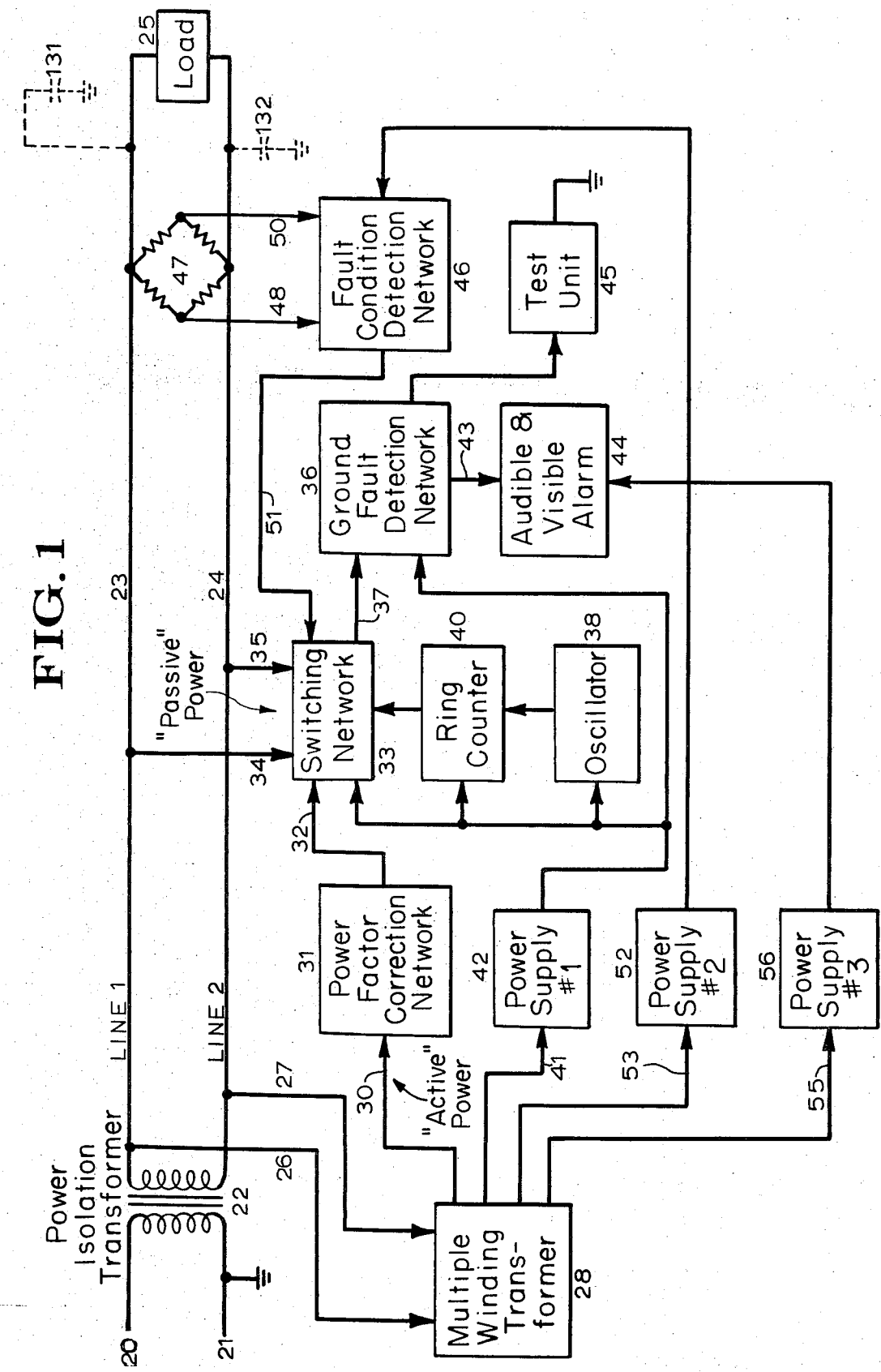
Figure 2:
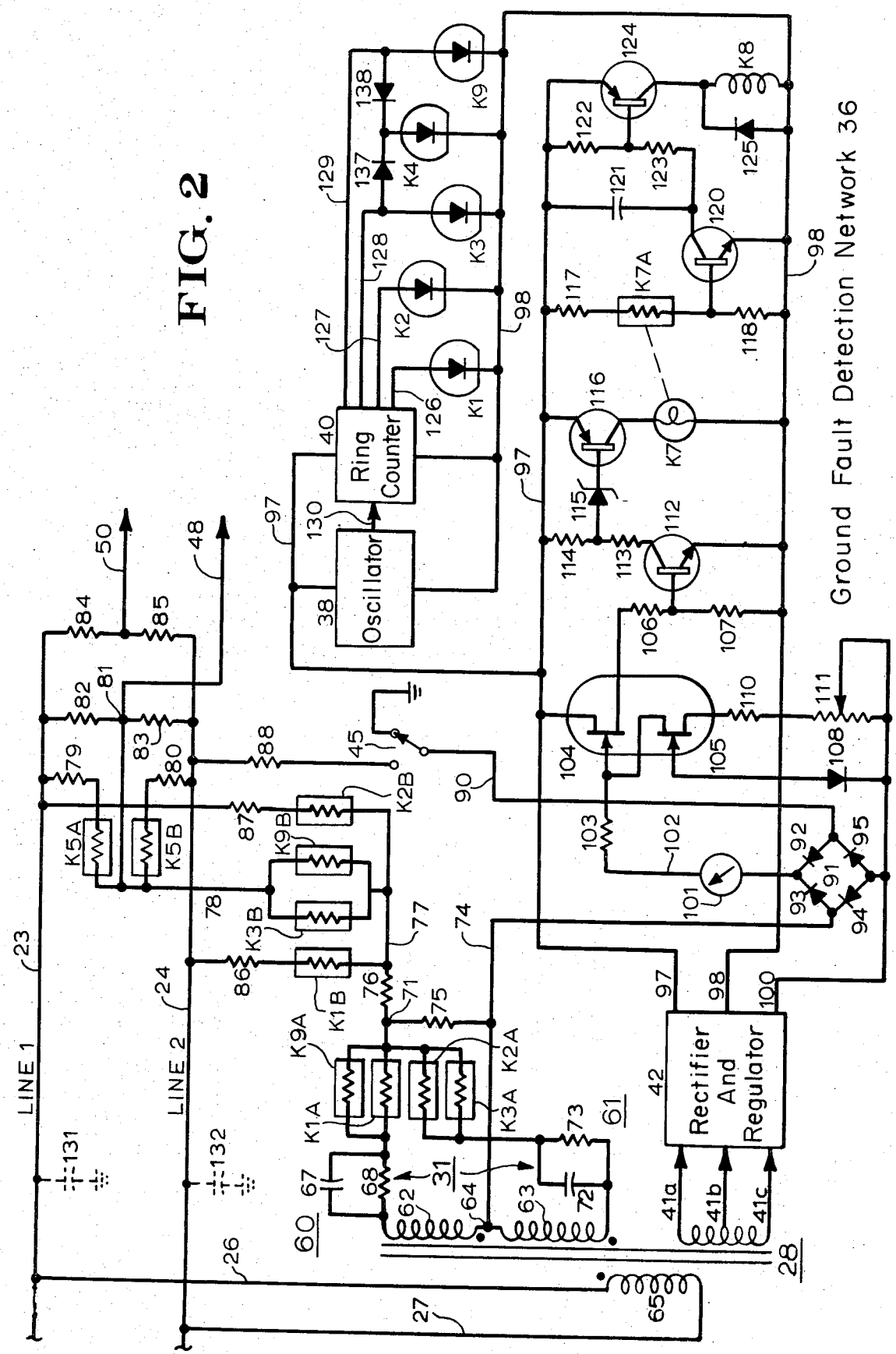

The schematic circuit in FIG. 2 includes a portion of the multiple winding transformer 28, power factor correction network 31 which includes two RC networks 60, 61, switching network 33, resistive bridge 47, ground fault detection network 36, and the ring counter and oscillator components together with first power supply unit 42. In more detail, one secondary winding of transformer 28 is shown as a control winding having two identical portions 62, 63 connected together at a center tap 64. The polarity dots adjacent windings 62, 63 show the respective polarities of the voltages induced in the secondary windings relative to the polarity of the voltage on the adjacent primary winding 65. The upper end of winding 62 is coupled over RC network 60, including capacitor 67 coupled in parallel with resistor 68, to a common connection of a pair of photocells K1A and K9A, which are coupled in parallel between network 60 and terminal point 71. It will become apparent in the following description that although shown as photocells, these components K1A and K9A represent a portion of a switching arrangement which also includes a light-emitting diode (LED) or other source of radiation. The source is positioned so that, when it is energized, radiation is incident upon the associated photocell to significantly lower its resistance and in effect provide a current path. Accordingly each combination of a light-emitting diode and its associated photocell(s) is exactly analogous to a switching means such as a relay, including a relay winding and one or more contact sets.

Additional photocells K2A and K3A are coupled in parallel, between terminal point 71 and one end of the other RC network 61, which includes capacitor 72 and resistor 73. The other end of this network 61 is coupled to the lower end of winding 63. Center tap 64 of the control secondary winding is coupled to a common conductor 74, and a resistor 75 is coupled between conductor 74 and terminal 71 to load the source of apparent power appearing between terminal 71 and line 74. Another resistor 76 is series-coupled between terminal 71 and conductor 77. Switching network 33 further comprises photocells K3B and K9B, coupled in parallel as shown, with one side of each of these photocells being coupled to conductor 77. The other side of this parallel network is coupled over conductor 78 to three separate paths: (1) photocell K5A and resistor 79 to line 1; (2) photocell K5B and resistor 80 to line 2; and (3) to terminal 81 in the resistor bridge circuit 47. Terminal 81 is at the junction of resistors 82 and 83, which are coupled between lines 1 and 2, or conductors 23 and 24, as shown. This resistive bridge circuit also comprises resistors 84 and 85, and output conductor 50 is coupled to the common connection of these resistors. Output conductor 48 is coupled to terminal 81.

Photocell K1B has one side connected to conductor 77 and the other side coupled over resistor 86 to line 2. Photocell K2B has one side coupled to conductor 77, and the other side coupled over resistor 87 to line 1. Line 2 is coupled over a resistor 88 to one fixed contact of test switch 45, the other fixed contact of which is connected to circuit ground. The movable contact of test switch 45 is coupled over a conductor 90 to one input terminal of a rectifier bridge 91, which includes diodes 92–95 connected as shown. Common conductor 74, connected to the terminal 64 at the midpoint of control winding 62, 63, is coupled to the other input connection of diode bridge 91.

Another secondary winding of transformer 28 passes a-c energy over conductors 41a, 41b and 41c to first power supply 42. As is well known in the art, this unit 42 may include both rectifier and regulator stages to provide d-c output energy on conductors 97, 98 and 100. For purposes of this explanation it will be considered that the d-c voltage on conductor 98 is a reference or zero voltage, with that on conductor 97 being positive with respect to the potential on conductor 98, and the voltage on conductor 100 being negative relative to that on conductor 98. Conductor 100 is coupled to the bottom of bridge 91, and the uppermost connection of this rectifier bridge is coupled over the movement of a meter 101, conductor 102 and resistor 103 both to the gate of a first field-effect transistor (FET) 104, and to the drain of a second FET 105. The drain of transistor 104 is coupled to energizing conductor 97, and the source of the same transistor is coupled through a series circuit comprising resistors 106, 107 to conductor 98. The gate of FET 105 is coupled through a diode 108 to conductor 100, and the source of this transistor is coupled through a series circuit including a resistor 110 and the effective portion of a variable resistor 111 to conductor 100. FET 105, resistors 110, 111, and diode 108 form a constant current network, which serves as a detector circuit in the ground fault detection network 36.

An NPN type transistor 112 has its emitter connected to conductor 98, its base coupled to the common connection between resistors 106 and 107, and its collector coupled over a series circuit including resistors 113 and 114 to conductor 97. A Zener diode 115 has its anode coupled to the common connection of resistors 113 and 114, its cathode coupled to the base of a PNP type transistor 116, the emitter of which is connected to conductor 97. The collector of transistor 116 is coupled through an incandescent lamp K7 to conductor 98. The output signal from detector circuit 105, 108, 110 and 111 is a peak signal, or a series of peak pulses. The filament of lamp K7 responds to an average value of the peak signals from the detector circuit. Photocell K7A is physically positioned to have its effective resistance varied as a function of the light emitted from lamp K7 which strikes the photocell; thus this lamp and its associated photocell together constitute a single switching means. The upper connection of photocell K7A is coupled through a resistor 117 to conductor 97, and the lower connection of this photocell is coupled through another resistor 118 to conductor 98. An NPN type transistor 120 has its emitter connected to conductor 98, its base coupled to the common connection between resistor 118 and photocell K7A, and its collector coupled through a capacitor 121 to conductor 97. A voltage divider including resistors 122 and 123 is coupled in parallel with capacitor 121. A PNP type transistor has its emitter connected to conductor 97, its base coupled to the common connection between resistors 122 and 123, and its collector coupled through the winding of relay K8 to conductor 98. A protective diode 125 is coupled in parallel with the winding of relay K8 in a well known manner. It will be apparent to those skilled in the art that this relay winding is exactly analagous to the provision of an incandescent lamp filament between the collector of transistor 124 and conductor 98, in that this relay winding together with its contact set K8A (lower portion of FIG. 3) together comprise a switching means.

D-C energy is supplied from rectifier and regulator circuit 42 over conductors 97, 98 to oscillator 38 and ring counter 40 as illustrated. Ring counter 40 provides output pulses sequentially over four successive conductors 126, 127, 128 and 129. The frequency of these pulses is one-fourth the frequency of the timing or reference pulses received from oscillator 38 over conductor 130. The first output pulse in the sequence from ring counter 40 is passed over conductor 126 to energize first light-emitting diode K1. Likewise the next pulse from ring counter 40 passes over conductor 127 to illuminate diode K2. The third pulse, passed over line 128, is effective to energize LED K3 and, over diode 137, also energizes K4. The fourth pulse energizes diode K9 over line 129, and, over diode 138, also turns on K4. Thus K4 is energized in both the third and fourth states of ring counter 40. The provision and operation of oscillators and ring counters to actuate different switching units in succession is well known in this art, and no further explanation is required.

To consider the operation of the system described thus far, it will first be considered that a ground fault is present on line 1 or on line 2. Such a fault, represented by capacitors 131 and 132, can be capacitive, or resistive, or a hybrid fault. At the outset it will be considered that the system is energized with power being transferred over transformer 28 so that rectifier and regulator circuit 42 energizes the system shown in FIG. 2. It will further be considered that at the instant under consideration there is a ground fault 131 on line 1 (conductor 23); ring counter 40 is in the first position, or state, with LED K1 activated; and the instantaneous polarity on line 23 is positive with respect to that on line 24. The photocells such as K1A in a preferred embodiment were of the type which exhibited a high resistance of the order of 100 megohms when not energized or illuminated, which resistance is reduced to approximately 10 kilohms when illuminated from its associated light-emitting diode. Because LED K1 is energized at this time the resistances of its associated photocells K1A and K1B are low. At this time current flows from line 1 or conductor 23 through the ground fault, from ground over the contacts of test switch 45, conductor 90, diode 92, meter 101, conductor 102, resistor 103, the drain and source of FET 105, resistor 110, variable resistor 111, diode 94, conductor 74, center tap 64, winding 62 of the secondary control winding, RC network 60, photocell K1A, resistor 76, photocell K1B and resistor 86 back to line 2 (conductor 24). This can be considered the passive current flow caused by the power received over lines 1 and 2 when a fault occurs on line 1. However with the transformer 28 having its control secondary winding connected as indicated by the polarity dots, the polarity of the voltage at the center tap 64 is positive with respect to the voltage at the upper end of winding 62. This active power is applied through switching network 33 to the metering circuit and causes current flow in the opposite direction, from center tap 64 over conductor 74 and the just-described circuit back to the upper end of winding 62. These two currents, the passive flow from the energy received over lines 23 and 24, and the active or phase-shifted flow from the voltage supplied over transformer 28, provide currents of substantially the same amplitude and 180° out of phase. Accordingly the system will not sense the line 1 fault at this instant in time, with the ring counter 40 in position 1.

Considering now the next state of operation in ring counter 40, diode K1 is deenergized and current is flowing through LED K2. The ground fault represented by capacitor 131 is still present on line 1. Current attempts to flow from the ground fault back through switch 45 and the previously described circuit to the center tap of control winding 62, 63. However from this center tap there is no complete path over either of photocells K1A or K9A, which exhibit high impedance. Current could attempt to flow through winding 63, the other RC network 61, photocell K2A, terminal 71, resistor 76, conductor 77, photocell K2B and resistor 87 back to line 1 (conductor 23). However there is no potential difference between the lines with this path, as there was in the first instance, when the described circuit was completed between conductors 23 and 24. Thus there is no passive current flowing at this moment. However the active current flow circuit including secondary winding 63 does provide current flow at this instant in time, with the voltage at the lower end of winding 63 positive with respect to center tap connection 64. Current flows from the lower end of winding 63 over RC network 61, photocell K2A, terminal 71, resistor 76, conductor 77, photocell K2B, resistor 87, line 23, ground fault 131, circuit ground, test switch 45, conductor 90, diode 92, meter winding 101, conductor 102, resistor 103, the drain and source of FET 105, resistor 110, variable resistor 111, diode 94, and conductor 74 back to center tap connection 64. At this time the active current flow is not opposed by any passive current, as was the case with the ring counter 40 in state 1. Accordingly there is sufficient current flow to exceed the constant current level established by FET 105 and diode 108, to increase the current flow through FET 104 and cause a positive-going voltage at the base of transistor 112, rapidly driving this transistor on.

As transistor 112 is switched on, the potential change at the connection of resistors 113 and 114 back biases Zener diode 115 to gate on transistor 116, causing a current flow through the filament of lamp K7 to rapidly decrease the impedance of its associated photocell K7A. This provides a positive-going signal at the base of transistor 120 which drives this transistor on, and in turn the conduction of transistor 120 provides a negative-going potential at the base of transistor 124, turning it on and energizing the winding of relay K8. As shown in the lower portion of FIG. 3, another secondary winding 133 of transformer 28 provides a-c energy to rectifier bridge 190, which in turn applies d-c energy between conductors 134 and 135. In the circuit as shown, with the contact set K8A in the position indicated, a first lamp 136 is normally energized. Conventionally this can be a green lamp to indicate that any leakage current present is below a threshold level. With current flow through the winding of relay K8, contact set K8A is displaced from the position indicated to engage the other fixed contact 137 of the contact set. This completes an obvious energizing circuit for the alarm 138, and for another lamp 140 which can be a red or warning device to signify that a dangerous level of fault (or leakage) current is flowing in the system. Alarm 138 can be an audible alarm such as a bell, siren or other desired unit. Of course the precise types and numbers of alarms to be energized when relay K8 is actuated is not significant to the fault detection and indicating operations of the present invention.

It should be noted that the time constant of the circuit including transistor 124 is chosen so that alarm 138 and trouble light 140 remain energized during at least one round of operation of ring counter 40, until the next time that LED K2 is energized in the sequence of dynamic detection. Alarm 138 can be turned off by actuating silencer switch 192 from its illustrated position to interrupt the flow of current to the alarm.

Considering again the circuit of FIG. 2, it is now assumed that the fault 131 has been removed and a ground fault represented by capacitor 132 is present between line 2 and ground. Again this fault, although illustrated as capacitive, can be capacitive, resistive, or a hybrid of capacitance and resistance. With ring counter 40 in the first state and LED K1 energized, photocells K1A and K2B have lowered impedance; it is apparent that the passive current attempting to flow from the ground fault on line 2 over the test switch 45 will be returned (over the path already described) to the same line 2. Thus there is no potential difference supplied between lines 23 and 24 at this time to cause passive current to flow. However at this time, with the potential on line 1 positive with respect to that on line 2, the active current flows from the bottom of secondary winding 62 over conductor 74, diode 93, meter 101, conductor 102, resistor 103, the drain and source of FET 105, resistor 110, variable resistor 111, diode 95, conductor 90, the terminals of test switch 45, circuit ground, ground fault 132, conductor 24, resistor 86, photocell K1B, conductor 77, resistor 76, photocell K1A, and RC network 60 to the top of winding 62. This active current flow is of a level sufficient to rapidly turn on transistor 112 with the consequent energization of relay K8 to sound the alarm as just described in connection with the fault on line 1.

Considering the next state of operation of ring counter 40, LED K1 is deenergized and LED K2 is energized, reducing the impedance of the photocells K2A and K2B. With the potential on line 1 positive with respect to that on line 2 at this time, passive current flows from line 23 over resistor 87, photocell K2B, conductor 77, resistor 76, photocell K2A, RC network 61, winding 63, terminal 64, conductor 74, diode 93, meter 101, conductor 102, resistor 103, FET 105, resistor 110, variable resistor 111, diode 95, conductor 90, test switch 45, circuit ground, and ground fault 132 to line 2. This passive current is equal in amplitude to, but 180° out of phase with, the active current flowing over the path just described (when the ring counter was in state 1). Thus these currents effectively cancel each other, and no alarm signal is given.

Figure 3:
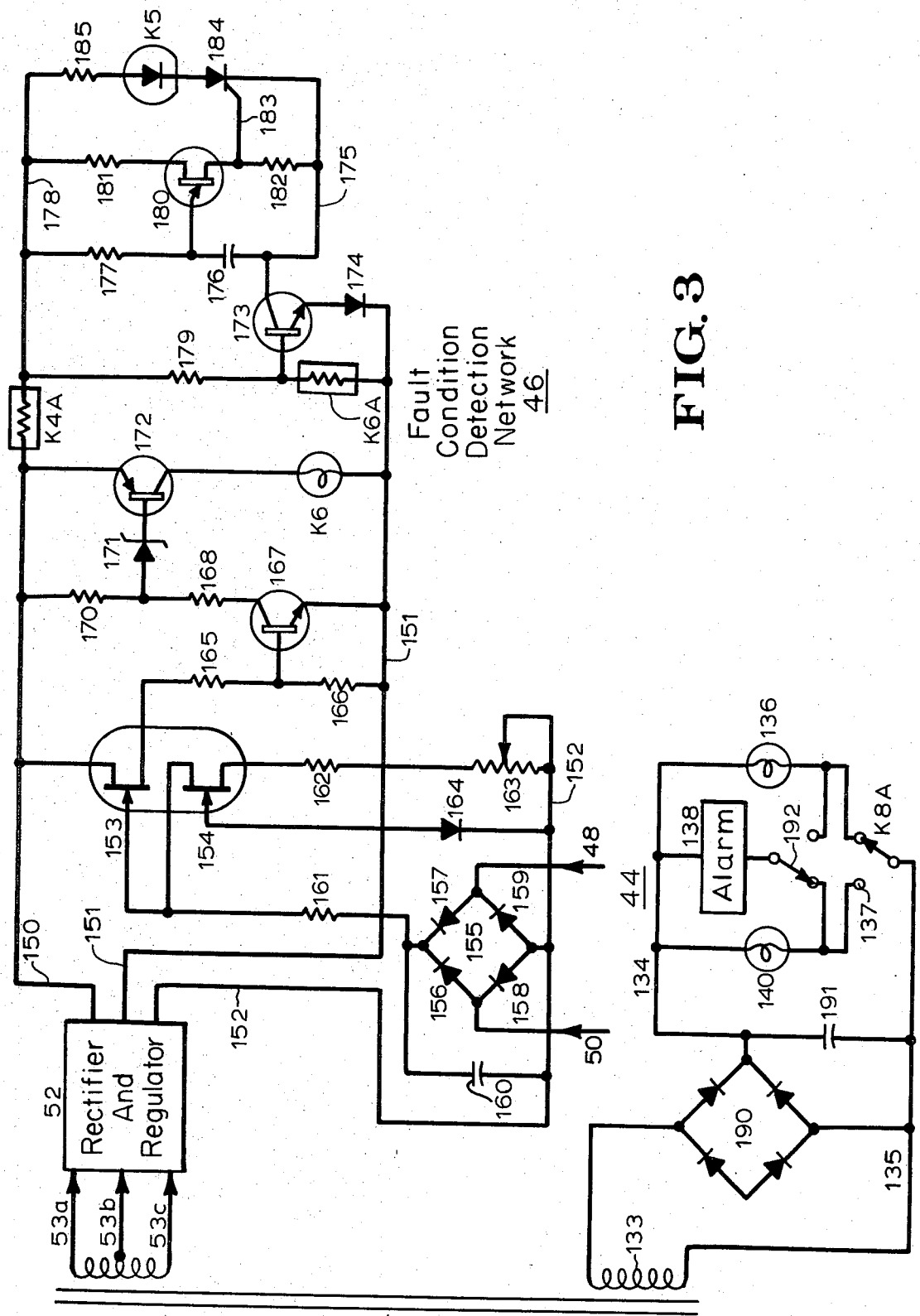

FIG. 3 illustrates the fault condition detection network 46. This network 46 functions to transmit a command signal (by energizing LED K5) to switching network 33 when there is a single ground on either line, or a substantially unbalanced fault on both lines. Second power supply unit 52 in FIG. 3 provides d-c output voltages on lines 150, 151 and 152. Line 151 can be considered that over which the reference or zero voltage is supplied, with the potential on line 150 being positive with respect to that on line 151, and the voltage on line 152 being negative relative to the potential on line 151. Another pair of FET's 153, 154 is connected as shown with the rectifier bridge 155 which includes diodes 156, 157, 158 and 159. The input signals to this bridge are received over lines 48, 50 (from bridge 47, FIG. 2) and one output terminal is coupled to conductor 152. A capacitor 160 is coupled across the output terminals, with the upper connection of the bridge being coupled through resistor 161 to the gate of FET 153 and the drain of FET 154. The detector circuit in this second network 46 is completed from the source of FET 154 over resistor 162 and the effective portion of variable resistor 163. The detector circuit also includes diode 164, coupled between the gate of FET 154 and line 152. The drain of FET 153 is coupled to conductor 150.

The output circuit of this detector arrangement includes the source of FET 153 which is coupled through a voltage divider arrangement including resistors 165, 166 to conductor 151. With the normal conditions in this circuit, NPN type transistor 167 is nonconducting.

The base of this transistor is coupled to the common connection between resistors 165, 166; its emitter is connected directly to line 151, and its collector is coupled over a series circuit including resistors 168, 170 to line 150. A Zener diode 171 is coupled between the base of a PNP type transistor 172, and the common connection between resistors 168 and 170. The emitter of transistor 172 is coupled to line 150, and its collector is coupled through the filament of another incandescent lamp K6 to conductor 151. The photocell K6A adjacent lamp K6 is located so that, upon energization of lamp K6, the effective impedance of photocell K6A drops substantially as already described. This photocell K6A is coupled between the base of another NPN type transistor 173 and conductor 151. A resistor 179 is coupled between the base of transistor 173 and conductor 178, which conductor is coupled over photocell K4A to conductor 150. The emitter of transistor 173 is coupled through diode 174 to conductor 151, and the collector is coupled both to a conductor 175, and through a series circuit including a capacitor 176 and a resistor 177 to conductor 178. When ring counter 40 is in the third or fourth state and LED K4 is energized, photocell K4A effectively completes an energization circuit over conductor 178 for those components connected between this conductor and conductor 175. These components include a unijunction transistor 180, which has its emitter coupled to the common connection between capacitor 176 and resistor 177. The base two connection of this unit is coupled through a resistor 181 to conductor 178, and its base one connection is coupled through a resistor 182 to conductor 175. Its base one connection is also coupled over conductor 183 to the gate of a silicon controlled rectifier (SCR) 184. The anode-cathode path of SCR 184 is coupled in series with light-emitting diode K5 and another resistor 185, between conductors 175 and 158.

In the circuit described thus far including the first switching network 33 and ground fault detection network 36, the portion including FET's 104 and 105, together with diode 108 and resistors 110, 111, can be considered a detector circuit for providing an output signal when the fault current exceeds a preset level. In the described switching network 33, resistor 76 in a preferred embodiment was given a value of 18 megohms, and all the other resistors in the switching and sensing arrangement had values small by comparison. By providing variable resistor 111 with a value of one megohm, at least an order of magnitude less than the value of series-coupled resistor 76, the setting of this variable resistor 111 can be adjusted when the equipment is aligned so that the total resistance in the circuit is approximately 19 megohms. At this level the output signal is issued through FET 104 and utilized, through the amplifier and averaging circuits, to energize the winding of relay K8. With 120 volts applied between lines 1 and 2, a current flow of only 6.3 microamperes is effective to trigger the alarm and indicate that the ground fault condition is present. This current flow is well within the range of protection desired for hospital operating rooms and other similar electrically sensitive patient environments. Of course, if it is desired to interrupt the transfer of energy when the leakage current reaches a preset level, an additional contact set can be provided for operation by relay K8 to terminate the transfer of energy between the power isolation transformer and the load. Those skilled in the art will readily understand the provision and incorporation of such an arrangement when it is desired.

Considering now the condition with simultaneous ground faults on lines 1 and 2, with ring counter 40 in state 1, LED K1 is energized to reduce the impedance of photocells K1A and K1B. When a balanced fault occurs the ground point is 60 volts away from the potential on either of lines 1 and 2 at a given moment. Under these conditions only half the normal fault current amplitude of the passive current will flow through the described circuit including photocells K1A and K1B. At this time a circuit is completed for the active current from the secondary or control winding 62. That is, current flows from center tap 64 of the control transformer, over conductor 74, diode 93, meter 101, conductor 102, resistor 103, the drain and source of FET 105, resistor 110, variable resistor 111, conductor 100, diode 95, conductor 90, the contacts of test switch 45, circuit ground, fault 132, line 2 (conductor 24), resistor 86, photocell K1B, conductor 77, resistor 76, photocell K1A, and RC network 60 back to the top of winding 62. As previously described this active current flow over secondary winding portion 62 of transformer 28 is 180° out of phase with the passive current provided over lines 1 and 2. The resultant current thus will be of the level of 3.15 microamperes, and the alarm will not be activated when the ring counter 40 is in state one.

Under the same conditions, when the ring counter advances to the next state and energizes LED K2, photocells K2A and K2B have their impedances substantially reduced. This condition will be the same as that just described for operation with the ring counter at stage 1, except that the active current flow path from transformer 28 will be completed over winding 63, and will include the photocells K2A, K2B and line 1. Thus again 3.15 microamperes of current flows through the detector circuit including the meter and FET 105, and the alarm is not activated.

It is noted that resistive bridge 47 only provides a signal on lines 48, 50 when there is a substantially unbalanced fault on both lines, or a ground fault on either line 1 or line 2. An unbalanced fault will thus provide current flow over conductors 48, 50, rectifier bridge 155 (FIG. 3), and the detector circuit including FET 154 to energize lamp K6 and (when photocell K4A is energized) to turn off transistor 173, deenergizing photocell K5. However at the instant under consideration there is a balanced fault on both lines, and thus no current flows over conductors 48, 50. Accordingly at this time diode K6 is not energized.

When ring counter 40 reaches the third state or position, light-emitting diodes K3 and K4 are energized simultaneously. Light from K4 is effective to significantly reduce the impedance of photocell K4A (FIG. 3), and under these conditions the base-emitter circuit of transistor 173 is forward biased, capacitor 176 charges and unijunction transistor 180 conducts to fire SCR 184, so that K5 is energized to substantially reduce the impedance of photocell K5A (FIG. 2). Considering the active (or phase shifted) current flowing from winding 63, this current flows through RC circuit 61, photocell K3A, resistor 76, photocell K3B, K5A, resistor 79, ground fault on line 1, circuit ground, contacts of switch 45, conductor 90, diode 92, meter 101, conductor 102, resistor 103, FET 105, resistor 110, a portion of resistor 111, diode 94, and conductor 74 back to the top of winding 63. This just-described circuit will provide approximately 3.15 microamperes of current flow through the detector circuit including FET 105. This current flow will however be augmented by another 3.15 microamperes over a path extending from the top of winding 62, except that, after passing through photocell K3B, this second current passes through photocell K5B and resistor 80 to the ground fault on line 2, and through circuit ground and the contacts of switch 45 over the remainder of the just-described current flow path. These two 3.15 microampere currents add to the total of 6.3 microamperes established as the preset level at which detection will occur and the alarm will be sounded in the preferred embodiment of this invention. However if the fault were not perfectly balanced the total current flow would not reach the required preset level to actuate the alarm, and for this reason the fourth switching stage has been included in the ring counter.

When ring counter 40 reaches state 4, the output pulse is passed over conductor 129 to energize LED's K9 and (through diode 138) K4. This immediately reduces the effective impedance of associated photocells K9A and K9B. In that K9B is in parallel with K3B, and K9A completes a path from the upper winding 62 (instead of the lower winding 63) of the control secondary which simulates the active source, it will be apparent to those skilled in the art that this circuit operation basically reverses the polarity of the active source which is "seen" by the circuit. By reversing the polarity of the active power source, the active current (6.3 microamperes) and a very small amount of the passive current will flow through the detector circuit. The amplitude of the passive current will depend upon the passive potential difference measured between the junction point of photocells K5A and K5B and ground. This ground potential to line 1 will not be equal to the ground potential to line 2. The detector circuit will be activated to energize the alarm when the ring counter is in state 3 or 4, depending on how the imperfectly balanced fault developed on line 1 and line 2.

While only a particular embodiment of the invention has been described and illustrated, it is manifest that various modifications and alterations may be made therein. It is therefore the intention in the appended claims to cover all such modifications and alterations as may fall within the true spirit and scope of the invention.

What is claimed is:

1. A system for detecting the presence of a ground fault on one or both of a pair of lines connected to transfer passive a-c energy between a power isolation transformer and a load, comprising:

means, coupled to said lines, for simulating an active power source and for providing active a-c energy which is either precisely in phase with, or is phase-shifted by 180° relative to, the passive a-c energy present on said lines;

a fault detection network, including a detector circuit connected to provide an alarm signal responsive to sensing a detector circuit current flow exceeding a preset level;

a switching network, coupled both to said lines and to the apparent source of active a-c energy, operable in different states to sequentially test the condition of said lines, and to complete a path for passing a current signal exceeding said preset level to the detector circuit when a fault condition occurs;

an alarm unit, connected to signal a ground fault condition when said current signal exceeds the preset level;

means for sequentially driving said switching network through its different states to continually test for ground faults; and means for energizing said system.

2. A system as claimed in claim 1, in which said detector circuit comprises a first active semiconductor unit connected to function as a constant current source, and a second active semiconductor unit, coupled to the first active semiconductor so that the preset current level is established by the active current source, and the alarm unit is energized when the current flowing through the second active semiconductor unit exceeds the preset level.

3. A system as claimed in claim 1, and further comprising a resistive bridge circuit coupled between said lines, and a fault condition detection network, coupled to the resistive bridge circuit, for providing a current signal exceeding said preset level when an unbalanced signal is received from the resistive bridge circuit due to a single fault occurring on either line, or due to occurrence of a substantially unbalanced double fault on both lines.

4. A detector system for signalling the presence of a ground fault on one or both of a pair of lines connected to transfer passive a-c energy of given frequency and given amplitude between a power isolation transformer and a load, comprising:

means for providing an apparent source of active energy of a frequency substantially equal to said given frequency and of an amplitude substantially equal to said given amplitude, but which active energy is either in phase with, or is phase-shifted by 180° relative to, the passive a-c energy present on said lines;

a ground fault detection network, including a detector circuit connected to provide an alarm signal responsive to sensing fault current flow exceeding a preset level;

a switching network, coupled both to said lines and to the apparent source of active a-c energy, operable in different states to sequentially test the condition of said lines, and to complete a path for passing a current signal exceeding said preset level to the detector circuit when a fault condition occurs;

means for sequentially driving said switching network through its different states to continually test for ground faults; and means for energizing said system.

5. A system as claimed in claim 4, in which the means for providing the apparent source of active energy includes a transformer having a control secondary winding, which system further includes a pair of resistor-capacitor networks, each network being coupled to one end of said control secondary winding, for providing substantially unity power factor for the source of apparent power seen by said switching network.

6. A system as claimed in claim 4 and in which said switching network comprises a series-coupled resistance of given value, and said ground fault detection network includes a variable resistor of a value at least an order of magnitude less than said given value, such that the alarm setting of the detector circuit can be adjusted while maintaining a high detector impedance to minimize leakage current from the detector system to the isolated lines.

7. A system as claimed in claim 4, and in which said ground fault detection network comprises an active semiconductor unit coupled in the detector current path for sensing a fault current exceeding a preset level, and further comprises means for indicating the amplitude of fault current flowing through the detector circuit.

8. A detector system as claimed in claim 4, and further comprising a test switch, connected for actuation to complete a path for detector current flow while still maintaining system isolation, thus testing the detector system without imposing a hazard on the a-c lines.

9. A detector system as claimed in claim 4, in which the means for providing an apparent source of active energy comprises a transformer, and an additional secondary winding on said transformer, a rectifier circuit coupled to said additional secondary winding to provide d-c energy, and an alarm circuit having at least one condition-indicating unit connected for energization by the d-c energy, thus minimizing capacitive fault leakage current which would otherwise be imposed by the detector system on the a-c lines.

10. A system as claimed in claim 4, in which the output signal from the detector circuit is a series of pulses, and further comprising an incandescent lamp having a filament winding connected to receive the pulse signals from the detector circuit such that the output signal from the lamp is an average value signal for indicating the presence of a fault condition.

11. A system as claimed in claim 4, in which the means for providing an apparent source of active energy includes a center-tapped secondary winding, and the ground fault detection network is coupled between the secondary winding connections and the pair of a-c lines under test, such that the means for driving the switching network in effect provides a phase modulation of the active energy by polarity reversal of the voltage provided over the secondary winding in synchronization with the sampling of the possible fault conditions by the ground fault detection network.

12. A system for detecting ground faults as claimed in claim 5, and in which said switching network comprises a plurality of photocells connected for sequential illumination by the means for sequentially driving the switching network, said photocells being disposed to complete current flow paths between each end of the control secondary winding and one of the two a-c lines over which passive energy is passed to the electrical load.

13. A detector system for signalling the presence of a ground fault on one or both of a pair of lines connected to transfer passive a-c energy of given frequency and given amplitude between a power isolation transformer and a load, comprising:

means for providing an apparent source of active energy of a frequency substantially equal to said given frequency and of an amplitude substantially equal to said given amplitude, but which active energy is either in phase with, or is phase-shifted by 180° relative to, the passive a-c energy present on said lines;

a ground fault detection network, including a detector circuit connected to provide an alarm signal responsive to sensing fault current flow exceeding a preset level;

a switching network, coupled both to said lines and to the apparent source of active a-c energy, operable in different states to sequentially test the condition of said lines, and to complete a path for passing a current signal exceeding said preset level to the detector circuit when a fault condition occurs;

a resistive bridge circuit coupled between said lines, for providing an unbalance signal when a single fault occurs on either line, and when a substantially unbalanced double fault occurs on both lines;

a fault condition detection network, connected to pass a signal to the switching circuit responsive to receipt of the unbalance signal from the resistive bridge circuit when the switching network is in certain ones of its different states;

means for sequentially driving said switching network through its different states to continually test for ground faults; and means for energizing said system.

14. A detector system as claimed in claim 13, and further comprising circuit means, coupled between the ground fault detection network and the resistive bridge circuit, for providing parallel current paths from the ground fault detection network to each of the pair of lines, such that under a balanced fault condition, the indicating means of the detector system can be calibrated for the same level of current as for operation with single line fault conditions.

15. A detector system as claimed in claim 13, in which the means for sequentially driving the switching network operates first to test for a ground fault on one line of the pair, second to test for a ground fault on the other line of said pair, third to test for simultaneous faults on both lines when the fault is unbalanced in a given direction, fourth to test for simultaneous faults on both lines when the fault is unbalanced in a direction opposite said given direction, and, during both the third and fourth steps, also tests for a balanced fault on both lines.

* * * * *